A. S. HUBBARD.
ELECTRICAL SYSTEM OF DISTRIBUTION.
APPLICATION FILED MAR. 18, 1908.
938,865.
Patented Nov. 2, 1909.
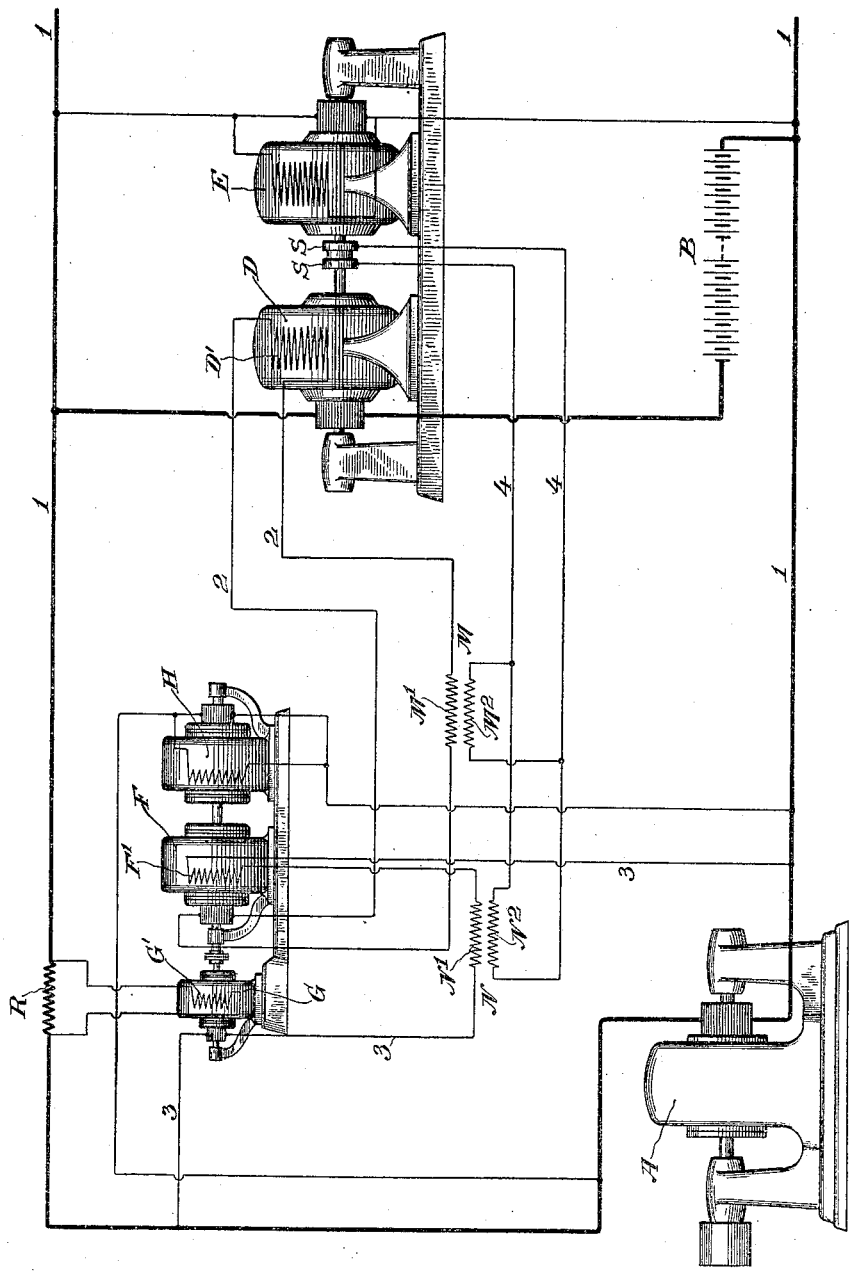

UNITED STATES PATENT OFFICE.

ALBERT S. HUBBARD, OF BELLEVILLE, NEW JERSEY, ASSIGNOR TO GOULD STORAGE BATTERY COMPANY, A CORPORATION OF NEW YORK.

ELECTRICAL SYSTEM OF DISTRIBUTION.

938,865.  Specification of Letters Patent.  Patented Nov. 2, 1909.

Application filed March 18, 1908. Serial No. 421,933.

*To all whom it may concern:*

Be it known that I, ALBERT S. HUBBARD, a citizen of the United States, and a resident of Belleville, county of Essex, and State of New Jersey, have invented certain new and useful Improvements in Electrical Systems of Distribution, of which the following is a specification.

My invention relates to electrical systems of distribution and more especially to automatic regulation of the same.

In the present instance the electrical system of distribution to which my various improvements have been applied is a system by which a storage battery is employed in connection with devices for regulating the action of the battery to steady the load on the main generator. The principal improvements herein shown in connection with this system apply to the closer and more efficient regulation by the removal of remanent magnetism from the regulating devices. It is found in such systems that when certain variations in the electrical condition of the system take place a certain amount of the energy of the regulating current is used up in removing the magnetic lag due to hysteresis or remanent magnetism. While this energy is being consumed no change of output in the regulating machine is produced and it is not until the magnetization of the fields has been brought to its average value for any exciting current that changes in the exciting or regulating current will materially affect the output of the regulating machines. To remove this remanent magnetism I propose to keep the magnetization of the fields at its average value for the existing exciting regulating current. To these ends I provide in the field circuits of the regulating machines a source of alternating current electromotive force, which has the effect of producing small but rapid fluctuations in the exciting direct current. These fluctuations in the exciting current cause the magnetizable material of the field structures to assume a magnetization equivalent to the average value of the magnetization for the existing exciting current. That is, for any given exciting current, the value of the magnetization is the same whether that point is reached by increasing or decreasing the exciting current. In this manner the deleterious effects due to hysteresis or remanent magnetism are effectively removed. These improvements in their broadest sense are not limited to this general character of a system but may be applied to other systems where such devices may be found advantageous.

More specific features of my invention will appear from the detailed description given below taken in connection with the accompanying drawing which forms a part of this specification.

The drawing shows diagrammatically one form of my improvements as applied to an electrical system of distribution in which a battery and booster are used to regulate the load upon the main generator.

In the drawings A represents a main generator feeding a main distribution circuit, 1, 1. Connected across the circuit 1, 1, is a battery B, and in series therewith a booster, D, driven at a practically constant speed by a shunt motor E connected across the circuit, 1, 1. The field D' of the booster D is energized by current from the armature of a dynamo or exciter, F, through the circuit 2, 2. The field F' of this exciter is in turn energized by current from the counter-electromotive force generator G, the armature of said counter-machine being in series with the field F' and connected across the terminals of the generator, A, by the connections, 3, 3, 3. The field G' of the counter-machine G, is connected in parallel with a resistance R inserted in the main circuit, 1. Both the counter-machine G and the exciter F are mechanically connected to and driven by a shunt motor H connected across the terminals of the main generator A.

Under normal conditions the voltage produced by the counter-machine G is equal and opposite to that produced by the generator A, hence no current will flow in the field F'. Under these conditions no current will be produced in the circuit, 2, 2, and field D' and the voltage generated by the booster D will be *nil* and it will be running idly. If, however, the load imposed upon the circuit, 1, 1, should increase above normal the voltage of the counter-machine G will increase, due to the increase of current in the field G'. This will cause a current to flow in the circuit 3, 3, 3, and excite the field F' of the exciter F. The exciter F will then furnish current in the proper direction through the circuit, 2, 2, to excite the booster D which will increase the voltage of the battery circuit and cause the battery to discharge to take the extra load imposed upon the system. If the load upon the main distribution circuit decreases below normal the reverse operations take place and the battery is charged from the main circuit, 1, 1.

To remove the lag due to hysteresis or remanent magnetism I provide transformers M and N, the secondaries M' and N' of which are placed in series in the circuits 2 and 3 respectively. The primaries M² and N² of these transformers are connected to a suitable source of alternating current through the circuit 4, 4. In the present instance for such source I utilize the armature of the motor E. This armature is tapped at electrically opposite points and connected to the circuit, 4, 4, by means of slip rings, S, S.

The transformers M and N cause fluctuations of the current in the circuits 2 and 3 which effectively remove the hysteresis or remanent magnetism effects from the fields which these circuits feed. This is due to the slight magnetization and demagnetization effects of these fluctuating currents which cause the flux of the field to rapidly pass through small cycles of magnetization and demagnetization and thus bring the flux to its average value for the existing exciting current. The frequency of the transformer currents and the proportioning of the transformer elements and voltage thereof are such that these fluctuations do not appreciably affect the booster to vary the battery action but this remains practically constant for any given electrical condition of the system. Thus a regulating dynamo excited by such means as I have described has a field strength that is substantially the same relatively to the value of the usual exciting current whether the exciting current has just been increased or has just been decreased. The field magnet has substantially the same magnetization curve for increasing exciting currents as for decreasing exciting currents, whereas the dynamo whose field is varied in the ordinary way has substantially different magnetization curves for increasing and decreasing exciting currents, whereby the same exciting currents at different times may produce substantially different regulating values.

I do not desire to be limited to the exact details shown and described since many changes may be made without departing from the spirit of my invention.

Having fully and clearly described my invention what I claim and desire to secure by Letters Patent is:

1. In an electrical system of distribution, the combination of a main distribution circuit, a storage apparatus in operative relation thereto, a dynamo-electric machine for regulating the action of said apparatus, means for producing a varying flux therein, and means for applying thereto a rapidly reversing magneto-motive force.

2. In an electrical system of distribution, the combination of a main distribution circuit, a battery in operative relation thereto, a regulating machine for regulating the action of said battery, means for varying the flux therein responsive to variations in the electrical condition of the system, and means for applying thereto a rapidly reversing magneto-motive force of a relatively small value.

3. In an electrical system of distribution, the combination of a main distribution circuit, a storage apparatus and booster in operative relation thereto, means for producing a variable flux in the booster and means for applying to the booster a rapidly reversing magneto-motive force.

4. In an electrical system of distribution, the combination of a main distribution circuit, a battery and booster in operative relation thereto, a regulating dynamo for said booster means for varying the field flux of said booster and regulating dynamo responsive to variations in the electrical condition of the system and means for applying thereto a rapidly reversing magneto-motive force of relatively small value.

5. In an electrical system of distribution, the combination of a main distribution circuit, a battery in operative relation thereto, a regulating dynamo-electric machine therefor, provided with a field structure and two sources of electro-motive force in operative relation with said field structure one being a direct current source and the other being an alternating current source of electromotive force.

6. In an electrical system of distribution, the combination of a main distribution circuit, a battery and booster in operative relation thereto, a regulating dynamo for said booster, said booster and regulating dynamo being provided with field structures and two sources of electro-motive force in operative relation to each, one being a direct current source and the other being an alternating current source of electromotive force.

7. In an electrical system of distribution, the combination of a main distribution circuit, a battery in operative relation thereto, a regulating dynamo for said battery, a field structure for said dynamo, means for varying the field strength of said structure responsive to variations in the electrical condition of the system and a source of alternating current electromotive force of substantially constant strength in operative relation to said field structure.

8. In an electrical system of distribution, the combination of a main distribution circuit, a battery and booster in operative relation thereto, an exciter for said booster, said booster and exciter being provided with field structures the field strength in which varies in accordance with certain direct current fluctuations and a source of alternating current electromotive force of substantially constant strength in operative relation to said field structures.

9. In an electrical system of distribution, the combination of a main distribution circuit, a battery in operative relation thereto, a regulating dynamo for said battery, a field structure for said dynamo, a variable source of direct current electromotive force for varying the field strength of said structure and a source of alternating current electromotive force for causing rapid fluctuations in the field flux of said structure.

10. In an electrical system of distribution, the combination of a main distribution circuit, a battery in operative relation thereto, a regulating dynamo for said battery, a field structure for said dynamo, a variable source of current for varying the field strength of said dynamo and means for causing rapid fluctuations in field flux of said dynamo.

11. In an electrical system of distribution, the combination of a main distribution circuit, a battery in operative relation thereto, a regulating dynamo-electric machine for varying the action of said battery, a source of variable direct current electromotive force for energizing said machine and means for superposing upon said direct current electromotive force an alternating current electromotive force.

12. In an electrical system of distribution, the combination of a main distribution circuit, a storage battery in operative relation thereto, a machine for regulating the action of said battery and means for removing the lag from said machine due to remanent magnetism.

13. In an electrical system of distribution, the combination of a main distribution circuit, a battery in operative relation thereto, a dynamo-electric machine for regulating the action of said battery responsive to variations in the electrical condition of the system and means for removing remanent magnetism from the field structure of said machine.

14. In an electrical system of distribution, the combination of a main distribution circuit, a battery in operative relation thereto, a booster in series with the battery and means for removing hysteresis effects from said booster.

15. In an electrical system of distribution, the combination of a main distribution circuit, a battery in operative relation thereto, a booster in series with the battery, an exciting device for said booster and means for removing hysteresis effects from said exciting device.

16. In an electrical system of distribution, the combination of a main distribution circuit, a battery in operative relation thereto, a booster, an exciting device for said booster and means for removing remanent magnetism from said booster and exciting device.

17. In an electrical system of distribution, the combination of a main distribution circuit, a battery in operative relation thereto, a machine for regulating the action of said battery and alternating current means for removing remanent magnetism from said machine.

18. In an electrical system of distribution, the combination of a main distribution circuit, a battery in operative relation thereto, a machine for regulating the action of said battery, and means for applying alternating current fluctuations to the field structure of said machine to remove the lag therefrom due to remanent magnetism.

19. In an electrical system of distribution, the combination of a main distribution circuit, a battery in operative relation thereto, a machine for regulating the action of said battery, and means for applying alternating current fluctuations in the field coil circuit of said machine.

20. In an electrical system of distribution, the combination of a main distribution circuit, a battery and booster in operative relation thereto, a machine for regulating the action of said booster, and means for applying alternating current fluctuations to said booster and said machine to remove remanent magnetism therefrom.

21. In an electrical system of distribution, the combination of a main distribution circuit, a battery and booster in operative relation thereto, an exciter for said booster and means for applying alternating current fluctuations in the field coil circuits of said booster and said exciter.

22. In an electrical system of distribution, the combination of a main distribution circuit, a battery and a regulating machine in operative relation thereto, a field coil for said machine responsive to variations in the electrical condition of the system, and a source of alternating current electromotive force in series with said field coil.

23. In an electrical system of distribution, the combination of a main distribution circuit, a battery and a regulating machine in operative relation thereto, a field coil for said machine responsive to variations in the electrical condition of the system, and a transformer in series with said field coil, the primary of said transformer being connected to a source of alternating current electromotive force.

24. In an electrical system of distribution, the combination of a main distribution circuit, a battery and booster in operative relation thereto, an exciter for said booster, field coils for said exciter and booster and transformers in series with said field coils, the primaries of said transformers being connected to a source of alternating current electromotive force.

25. The combination of a dynamo-electric machine and its field structure, means for producing a varying flux therein and means for applying thereto a rapidly reversing magneto-motive force for cutting down the effects of remanent magnetism.

26. The combination of a dynamo-electric machine and its field structure, and two sources of electromotive force in operative relation with said field structure one being a direct current source and the other an alternating current source of electromotive force.

27. The combination of a dynamo-electric machine provided with the usual field structure, and means for removing the remanent magnetism from said field structure.

28. The combination of a dynamo-electric machine and its field structure, a variable source of direct current for varying the field strength of said structure and a source of alternating current electromotive force for causing rapid fluctuations in the field flux of said structure for removing remanent magnetism from the field structure.

29. The combination of a dynamo-electric machine and its field structure, a variable source of current for varying the field strength of said machine and means for causing rapid fluctuations in the field flux of said machine.

30. The combination of a dynamo-electric machine and its field structure, a source of variable direct current electromotive force for energizing said field structure and means for superposing upon said direct current electromotive force an alternating current electromotive force.

31. The combination of a dynamo-electric machine provided with a field of variable strength and means for removing the remanent magnetism from said field.

32. The combination of a dynamo-electric machine provided with a field of variable strength and means for applying alternating current fluctuations to said field to remove the lag therefrom due to remanent magnetism.

33. The combination of a dynamo-electric machine provided with field coils for producing a field flux of varying strength, a transformer in series with said field coil, the primary of which is connected to a source of alternating current electromotive force.

34. The combination of a dynamo-electric machine, a motor for driving said machine, connections between the armature of said motor and the field structure of said dynamo-electric machine for removing remanent magnetism from said machine.

35. The combination of a dynamo-electric machine, a motor for driving said machine, a field of varying strength for said machine, a source of alternating current electromotive force for removing remanent magnetism from said field and derived from the armature of said motor.

36. The combination of a dynamo-electric machine having field coils producing a field of variable strength, a second dynamo-electric machine in operative relation thereto and furnishing alternating current fluctuations to the field of said first mentioned machine.

37. The combination of a dynamo-electric machine having field coils producing a field of variable strength, a transformer in series with said field coils, and a second dynamo-electric machine in operative relation with said first mentioned machine and furnishing alternating current to the primary of said transformer.

In testimony whereof, I have signed my name to this specification, in the presence of two subscribing witnesses.

ALBERT S. HUBBARD.

Witnesses:
ANNA DALY,
EDWIN SEGER.